US006477836B1

(12) United States Patent
Bianchetta et al.

(10) Patent No.: US 6,477,836 B1
(45) Date of Patent: Nov. 12, 2002

(54) PILOT CONTROL SYSTEM

(75) Inventors: Donald L. Bianchetta, Coal City, IL (US); Bernard J. Wulff, Oswego, IL (US); John V. Mount, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 15 days.

(21) Appl. No.: 09/696,853

(22) Filed: Oct. 26, 2000

(51) Int. Cl.$^{7}$ ................................................ F16D 31/02
(52) U.S. Cl. .............................. 60/422; 60/442; 91/461
(58) Field of Search .......................... 60/413, 422, 442, 60/486; 91/461

(56) References Cited

U.S. PATENT DOCUMENTS 2,005,732 A 6/1935 Ernst et al.
2,206,523 A 7/1940 Anderson
4,126,993 A 11/1978 Grattapaglia et al.
4,373,869 A 2/1983 Martin et al.
4,426,194 A 1/1984 Pollman
5,207,059 A * 5/1993 Schexnayder ................ 60/465
5,564,274 A 10/1996 Denbraber et al.
5,666,807 A 9/1997 Bianchetta

* cited by examiner

*Primary Examiner*—Edward K. Look
*Assistant Examiner*—Michael Leslie
(74) *Attorney, Agent, or Firm*—Andrew Calderon; J. W. Burrows

(57) ABSTRACT

A pilot control system for maintaining a constant operating hydraulic fluid pressure in a hydraulic system throughout a range of hydraulic fluid flow and temperature conditions. The pilot control system has a pilot pump and a pilot relief valve in fluid communication with the pilot pump. A first pressure reducing valve is in fluid communication with the pilot pump and the pilot relief valve so as to reduce the pressure to components downstream of the pressure reducing valve.

12 Claims, 2 Drawing Sheets

PILOT CONTROL SYSTEM

TECHNICAL FIELD

This invention relates generally to a pilot control system and, more particularly, to a pilot control system for maintaining a constant operating hydraulic fluid pressure in a hydraulic system throughout a range of hydraulic fluid flow and temperature conditions.

BACKGROUND ART

Machines such as power generation sets, earth working machinery, paving machinery, load transfer carrying machinery, excavators and the like use hydraulic systems to manipulate and control the many components of the machine. These hydraulic systems may be used to manipulate such components as booms, buckets, scrapers, rippers and the like. The hydraulic systems may also be used to maintain an operating pressure in a track tension system of the machine, as well as to provide adequate pressure for steering and braking operations of the machine.

A hydraulic pump, which is regulated by an engine speed of the machine, is used to maintain a desired operating pressure of the hydraulic system and its many components. However, it is well known that the many different components of the machine such as, for example, the boom and the track tension system, require different operating pressures. By way of illustrative example, the track tension system may require an operating pressure of approximately 7000 kpa (1015 psi) while the boom may require a lower operating pressure of approximately 4000 kpa (580 psi). If the operating pressures of these components are not maintained within the proper design parameters, the machine components may be damaged during operations of the machine. It is thus very important to adequately control and regulate the operating pressures of the many components on the machine.

A pilot control system is used to control, regulate and maintain the operating pressures of the many components of the machine. That is, the pilot control system is used to maintain the operating pressure of both a component requiring a high operating pressure (e.g., track tension system) and a component requiring a lower operating pressure (e.g., boom or other component). This is accomplished by providing several relief valves in series, each having different operating parameters. For example, a hydraulic system used to maintain an operating pressure of approximately 7000 kpa (1015 psi) for the track tension system and an operating pressure of approximately 4000 kpa (580 psi) to control the main hydraulic system for the boom, may require a pilot control system having a 7000 kpa (1015 psi) pressure relief valve in conjunction with a set of two lower pressure relief valves (e.g., a 3000 kpa (435 psi) pressure relief valve and a 4000 kpa (580 psi) relief valve downstream of the 3000 kpa (435 psi) relief valve). This arrangement of relief valves provides two operating pressures, one at 7000 kpa (1015 psi) and another at 4000 kpa (580 psi).

However, as is well known in the art of hydraulic systems, the operating pressures of the hydraulic system are dependent on the flow rate and temperature of the hydraulic fluid. Thus, at a lower flow rate or a higher temperature, the operating pressure of the hydraulic system will decrease proportionally. This fluctuation in the operating pressure of the hydraulic fluid upstream of the relief valves affects the operations of the relief valves of the pilot control system; that is, the relief valves are very sensitive to fluctuating operating pressures and thus cannot adequately maintain and regulate the minimum operating pressures (downstream) for many of the components of the machine during these states of operating pressure fluctuations. This inability to maintain and regulate a proper operating pressure for the many components results in damage to the components of the machine.

U.S. Pat. No. 4,126,993 to Grattapaglia et al., which was issued on Nov. 28, 1978, shows a hydraulic system for an earth moving machine and a temperature-controlled valve for a hydraulic system. The hydraulic system includes two relief valves and a temperature control system for monitoring the temperature of the hydraulic fluid. However, the Grattapaglia et al. system does not compensate for fluctuations in operating pressures due to different flow conditions. Also, the Grattapaglia et al. system includes relief valves in line with components of the earth moving machine which are sensitive and unable to maintain adequate operating pressures when the pressure of the hydraulic fluid fluctuates upstream from the relief valves.

The present invention is directed to overcoming one or more of the problems as set forth above.

DISCLOSURE OF THE INVENTION

In one aspect of the present invention a pilot control system has a pilot pump and a pilot relief valve in fluid communication with the pilot pump. A first pressure reducing valve is in fluid communication with the pilot pump and the pilot relief valve. The pressure reducing valve reduces the predetermined supply pressure to a first reduced pressure.

In another aspect of the present invention a machine has a pilot control system. The machine has a track tension system, at least one hydraulic actuator and a pilot pump and a main hydraulic system. The pilot pump supplies hydraulic fluid to the track tensioning system and the main hydraulic system supplies main hydraulic fluid to the at least one hydraulic actuator. A pilot relief valve regulates a supply pressure of the hydraulic fluid and a first pressure reducing valve, in fluid communication with the pilot pump, reduces the supply pressure to a first reduced pressure.

BEST MODE FOR CARRYING OUT THE INVENTION

Figure 1:
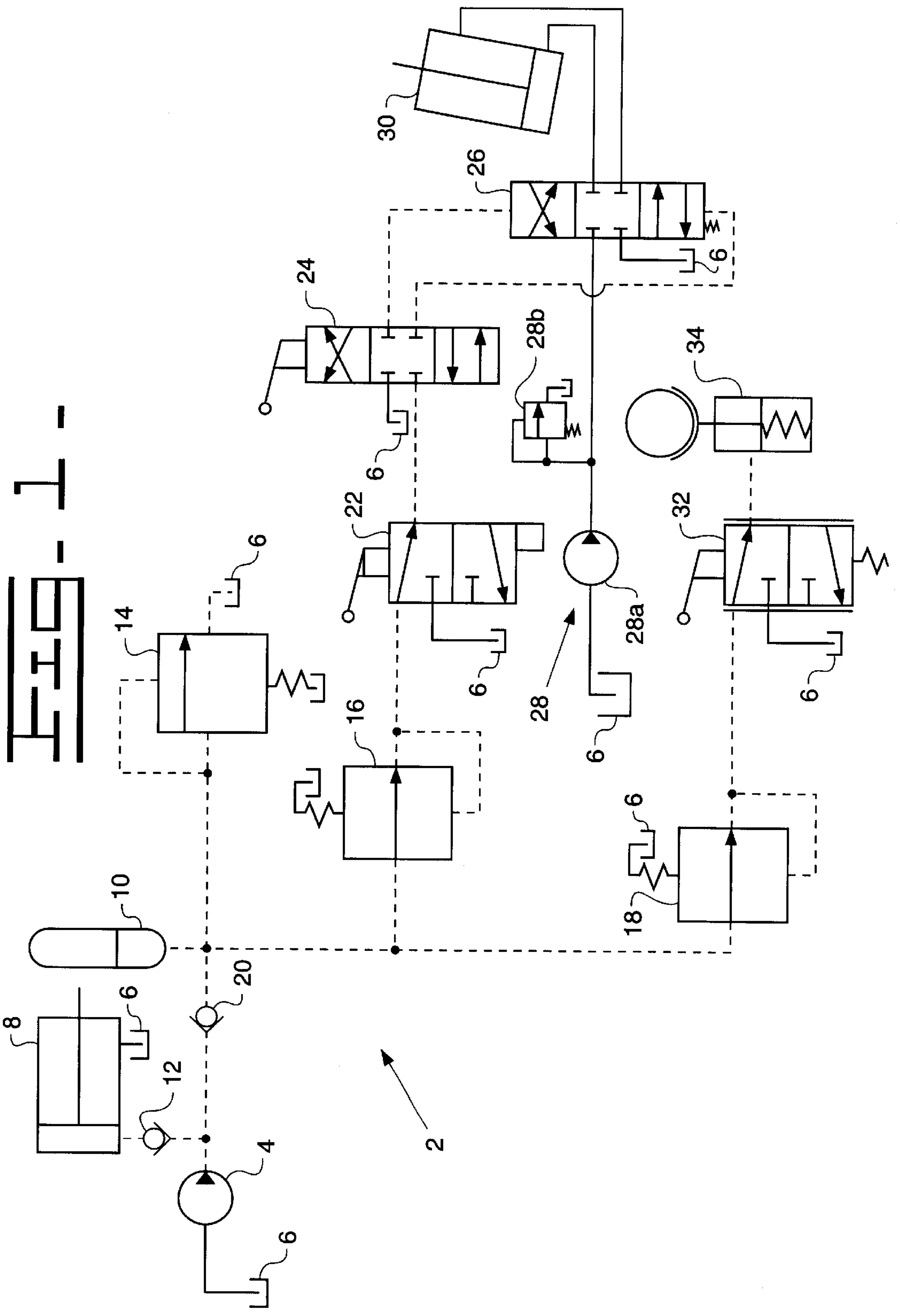
FIG. 1 shows a schematic view of a pilot control system of the present invention using a pair of pressure reducing valves in parallel.

FIG. 1 shows a pilot control system used to regulate and maintain a constant hydraulic pressure in components of a machine adapted for use with the present invention. These components may be, for example, booms, diggers, scrapers and the like.

The pilot control system of FIG. 1 is generally depicted as reference numeral 2 and includes a pilot pump 4 in fluid communication with a reservoir 6. The pilot pump 4 is in further fluid communication with a track tension system 8 and a fluid accumulator 10. The reservoir 6 is in fluid communication with the track tension system 8. A first one way check valve 12 is located between the pilot pump 4 and the track tension system 8.

Still referring to FIG. 1, the pilot pump 4 is also in fluid communication with a pilot relief valve 14 as well as a first pressure reducing valve 16 and a second pressure reducing valve 18, in parallel arrangement. The pilot relief valve 14, the first pressure reducing valve 16 and the second pressure reducing valve 18 are also in fluid communication with the reservoir 6. The first and second pressure reducing valves 16 and 18 are adjusted or tuned to different operating parameters. It should be well understood by those of ordinary skill in the art that more than two pressure reducing valves may be used (in parallel) with the pilot control system of the present invention, depending on the components and operating pressure requirements of the components used with the pilot control system of the present invention.

A second one way check valve 20 is positioned downstream of the pilot pump 4 and upstream of the pilot relief valve 14, the first and second pressure reducing valves 16 and 18 and the accumulator 10. The first pressure reducing valve 16 is in fluid communication with a shut-off valve 22 which, in turn, is in fluid communication with a pilot control valve 24. The pilot control valve 24 is in further fluid communication with a directional control valve 26 and reservoir 6. The directional control valve 26 also is in fluid communication with reservoir 6. Upstream of the directional control valve 26 is a main hydraulic system 28 which includes a main hydraulic pump 28*a* in fluid communication between the reservoir 6 and a main relief valve 28*b*. A hydraulic actuator 30 is located downstream and in fluid communication with the main hydraulic system 28 via the control valve 26.

The second pressure reducing valve 18 is in fluid communication with a brake control valve 32, which may be infinitely variable and which is in fluid communication with the reservoir 6. Downstream of the brake control valve 32 is a spring applied-pressure release brake system 34.

Figure 2:
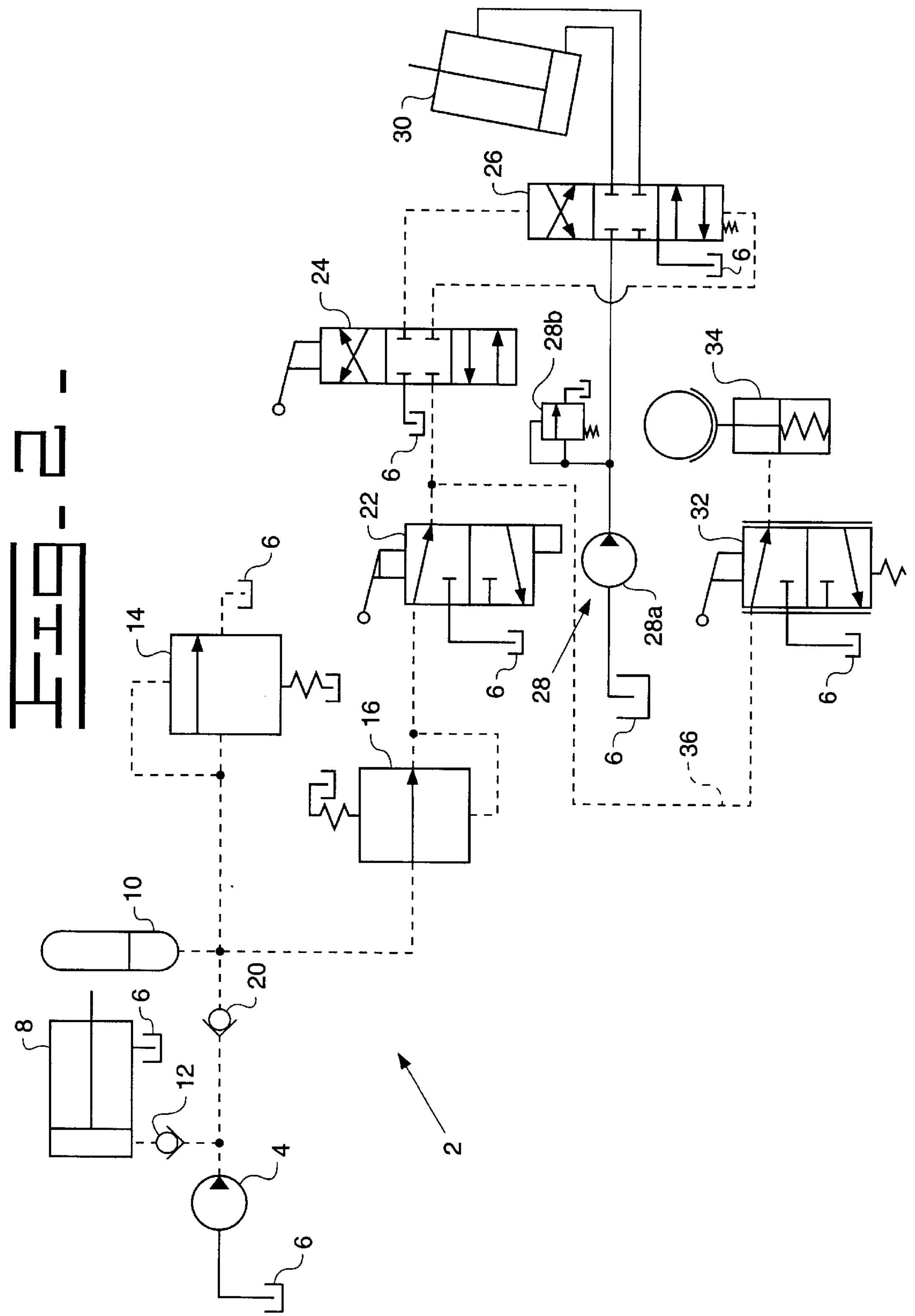
FIG. 2 shows a schematic view of a pilot control system of the present invention using only one pressure reducing valve.

FIG. 2 shows a second embodiment of the present invention utilizing a single pressure reducing valve 16, hydraulic fluid is diverted downstream from the pressure reducing valve 16 to the brake control valve 32.

INDUSTRIAL APPLICABILITY

In operation, a constant hydraulic fluid pressure is maintained by the pilot control system 2 of the present invention. This is accomplished by use of the first and second pressure reducing valves 16 and 18 which ensure adequate and constant operating pressures downstream of the valves regardless of the flow rate (engine speed) or temperature conditions of the hydraulic fluid. Thus, the first and second pressure reducing valves 16 and 18 are capable of regulating and then maintaining a constant and adequate operating pressure during, for example, start-up conditions, high engine speed conditions, cold weather conditions and the like.

In use, hydraulic fluid is pumped from the reservoir 6 to the track tension system 8 and the accumulator 10. The one way check valves 12 and 20 ensure that the fluid in the line between the pilot pump 4 and the track tension system 8 and the accumulator 10, respectively does not reverse flow. The track tension system 8 and the accumulator 10 are well known components and a discussion of these components will thus be omitted herein.

The pilot relief valve 14 is set to an operating pressure which regulates the supply pressure generated from the pilot pump 4 and which is needed to operate the track tension system 8. This supply pressure should be greater than the reduced regulated pressures of the first and second pressure reducing valves 16 and 18. By way of illustration and not to limit the present invention in any manner, the pilot relief valve 14 may be set to approximately 7000 kpa (1015 psi) in order for the system to maintain a 7000 kpa (1015 psi) supply pressure for the track tension system 8. If the pressure of the hydraulic fluid exceeds the set operating pressure, the pilot relief valve 14 will open and allow the hydraulic fluid to flow to the reservoir 6 thus reducing the hydraulic pressure. This safeguards against the track tension system 8 being supplied with more than the required 7000 kpa (1015 psi) of hydraulic pressure.

The supply pressure of the hydraulic fluid is further supplied to both the first and second pressure reducing valves 16 and 18. The first pressure reducing valve 16 reduces the pressure of the hydraulic fluid from the supplied pressure of, for example, 7000 kpa (1015 psi), to a lower reduced and regulated pressure required for the proper implementation of the directional control valve 26. As an example, the first pressure reducing valve 16 may be set to reduce the supply pressure from 7000 kpa (1015 psi) to approximately 4500 kpa (653 psi). At the regulated 4500 kpa (653 psi), the hydraulic fluid is supplied to the shut off valve 22 as well as the pilot control valve 24. The hydraulic fluid is then supplied to the directional control valve 26 which opens thus allowing hydraulic fluid from the main hydraulic system 28 to flow through the directional control valve 26 to the hydraulic actuator 30. The hydraulic actuator 30 can then be manipulated by the hydraulic pressure (e.g., 12,000 kpa (1740 psi) to 15,000 kpa (2175 psi)) generated from the main hydraulic system 28. The manipulation of the actuator may include, for example, (i) raising or lowering a boom, (ii) extending or retracting a bucket, or (iii) opening and closing a clamshell.

The second pressure reducing valve 18 reduces the supply pressure to a different reduced and regulated pressure than the first pressure reducing valve 16. For example, the second pressure reducing valve may reduce the supply pressure from 7000 kpa (1015 psi) to 4000 kpa (580 psi). The 4000 kpa (580 psi) can then be used to control the spring applied-pressure release brake 34.

It is noted that both the pilot control valve 24 and the brake control valve 32 can be turned off completely for safety reasons. It should further be understood that the regulated hydraulic pressure of the first and second pressure reducing valves 16 and 18 will be maintained so long as the supply pressure to the first and second pressure reducing valves 16 and 18 is greater than the regulated pressure. Also, the first and second pressure reducing valves 16 and 18 are not sensitive to pressure fluctuations in the supply pressure and thus will be able to maintain the regulated pressure regardless of the flow rate or temperature conditions of the hydraulic fluid. Thus, by use of the present invention, the regulated pressure may be maintained under all conditions.

Other aspects and features of the present invention can be obtained from a study of the drawings, the disclosure, and the appended claims.

What is claimed is:

1. A pilot control system for use in a fluid system of a machine, comprising:

a main hydraulic system for supplying main hydraulic fluid to a hydraulic actuator, the main hydraulic system including a main hydraulic pump connected to a hydraulic actuator through a directional control valve;

a pilot pump;

a pilot relief valve in fluid communication with the pilot pump and operative to set a predetermined pilot supply pressure; and a first pressure reducing valve in fluid communication with the pilot pump and the pilot relief valve, the pressure reducing valve reducing the predetermined pilot supply pressure to a first reduced pressure.

2. The pilot control system of claim 1, wherein the first reduced pressure is used to control the hydraulic actuator of the machine.

3. The pilot control system of claim 1, including at least a second pressure reducing valve in parallel with the first pressure reducing valve, the at least second pressure reducing valve reducing the predetermined pilot supply pressure to a second reduced pressure.

4. The pilot control system of claim 3, including a one way check valve positioned between the pilot pump and each of the pilot relief valve and the first and the at least second pressure reducing valves.

5. The pilot control system of claim 3, including a spring applied-pressure release brake system in fluid communication with the at least second pressure reducing valve, the spring applied-pressure release brake system being actuated at the second reduced pressure.

6. The pilot control system of claim 5 including a brake control valve in fluid communication between the at least second pressure reducing valve and the spring applied-pressure release brake system.

7. The pilot control system of claim 3, wherein the first pressure reducing valve and the at least second pressure reducing valve regulate and maintain downstream the first reduced pressure and the second reduced pressure, respectively, at a constant pressure during fluctuations of the predetermined supplied pressure of the hydraulic fluid.

8. The pilot control system of claim 1, including a track tension system, the track tension system using the supplied pressure to provide a predetermined tension to a track associated with the track tension system.

9. A machine having a pilot control system for regulating a pressure of hydraulic fluid, comprising:

a track tension system;

at least one hydraulic actuator;

a pilot pump for supplying hydraulic fluid to the track tensioning system;

a main hydraulic system for supplying main hydraulic fluid to the at least one hydraulic actuator;

a pilot relief valve in fluid communication with the pilot pump for regulating a supply pressure of the hydraulic fluid supplied to the track tension system;

a first pressure reducing valve in fluid communication with the pilot pump and the pilot relief valve, the pressure reducing valve reducing the supply pressure to a first reduced pressure; and a directional control valve in fluid communication with the first pressure reducing valve and the main hydraulic system, the directional control valve opening in response to the reduced supply pressure thereby allowing the main hydraulic fluid to flow through the directional control valve to the at least one hydraulic actuator.

10. The machine of claim 9, including:

a second pressure reducing valve in fluid communication with the pilot pump and the pilot relief valve, the second pressure reducing valve lowering the supplied pressure to a second reduced pressure; and a spring applied-pressure release brake system in fluid communication with the second pressure reducing valve and which is activated at the second reduced pressure.

11. The machine of claim 10 including a one way check valve positioned between the pilot pump and the pilot relief valve and the first and the second pressure reducing valves.

12. The machine of claim 10, including an accumulator in fluid communication with the pilot pump, the first pressure reducing valve, the second pressure reducing valve and the pilot relief valve.

* * * * *